United States Patent [19]
Morjan

[11] 3,864,813
[45] Feb. 11, 1975

[54] PROCESS FOR CONDITIONING THE WELDING AREA OF THE CYLINDRICAL BODY OF A PACKING CAN

[75] Inventor: Jean Morjan, Koekelberg-Brussels, Belgium

[73] Assignee: Etablissements J. B. Gabriels S.P.R.L., Brussels, Belgium

[22] Filed: July 3, 1973

[21] Appl. No.: 376,115

[30] Foreign Application Priority Data
June 6, 1973 Belgium .............................. 52820

[52] U.S. Cl.............. 29/475, 29/480, 113/116 R, 113/120 K, 220/1 BC, 220/75, 220/DIG. 1
[51] Int. Cl........................................ B23k 31/02
[58] Field of Search...................... 29/475, 480, 482; 113/120 K, 120 L, 116 R; 220/75, 1 BC, DIG. 1

[56] References Cited
UNITED STATES PATENTS
1,495,653   5/1924   Thomas et al. .................. 29/482 X
2,120,007   6/1938   Tear ................................ 220/75 X
3,126,625   3/1964   Laing .............................. 29/475 X
3,502,243   3/1970   Erlandson et al. .................. 220/75

Primary Examiner—C. W. Lanham
Assistant Examiner—Victor Di Palma
Attorney, Agent, or Firm—Bacon & Thomas

[57] ABSTRACT

A process for conditioning the weld area of a metal can, consisting in locally distorting by means of a roller pair the sheet metal in the region of the overlap of the opposite edges, so as to obtain an almost continuous cylindrical surface on the inside of the body with a groove of small width in the region of aforesaid overlapping edges. The roller pair includes an inner roller having an outer transverse contour corresponding to the inner can diameter, and the outer roller has two diameters separated by a step portion, preferably a bevel surface. The seam is passed through the rollers so that the step portion deforms the can body in the area of the inner free edge of the welded seam to reduce to a minimum the internal offset area along opposite sides of the seam in the vicinity of the inner free edge.

2 Claims, 3 Drawing Figures

PROCESS FOR CONDITIONING THE WELDING AREA OF THE CYLINDRICAL BODY OF A PACKING CAN

The present invention is concerned with a conditioning process for the welding area of the cylindrical body of a packing can, more particularly intended to contain beer.

As is generally known, the body of packing cans is fabricated by cutting and rolling sheet metal, two opposite edges of the latter overlapping in view of being subsequently joined together by electric welding.

More particularly when such packing cans reach considerable dimensions, of the order of one US gallon for instance, a delicate problem crops up regarding the inner coating of the body. This inner surface must indeed be covered by one or more coatings of an appropriate varnish in order to protect the liquid which has subsequently to be contained in the can against any deterioration due to oxidation, even very localized, of the metal of which the can body is built. It must be remembered indeed, that containers or cans of larger dimensions made for containing beer, for instance, have bodies made of tinplate, a metal which very easily "contaminates" beer, were it only with respect to its taste.

By means of the known precesses mentioned above for constructing the can body, it is extremely difficult industrially to obtain a perfectly continuous protecting film on the inner surface of the cylindrical body, in the area of the weld.

This inner surface of the body does indeed show an area of brutal discontinuity and it has proved almost impossible to provide a continuous protective coating on the inner free edge surface of the sheet metal and on the adjacent region of the other edge of the rolled metal sheet forming the body of the can.

The purpose of the present invention is to eliminate these inconveniences.

For this purpose, a conditioning process is suggested for the weld area which consists in locally distorting the sheet metal in the region of the overlap of the opposite edge, so as to obtain an almost continuous cylindrical surface on the inside of the body, with a groove of smallest possible width in the region of aforesaid overlapping edges in the area of the inner free edge, the actual width being a function of the characteristics of the metal used and of the thickness of the latter.

This distortion shall preferably be brought about by a rolling process on leaving the welding machine.

The small width of aforesaid groove on the one hand, and the viscosity of the protecting varnish subsequently applied upon the inner surface of the body on the other hand, will guarantee the continuity of the protective coating.

For easier comprehension, the present invention will be described hereinafter in greater detail with reference to the appended drawings in which.

Figure 1:
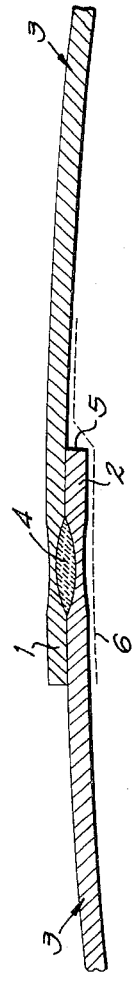
FIG. 1 shows a radial cross-section of the weld area of a conventional packing can.
Figure 2:
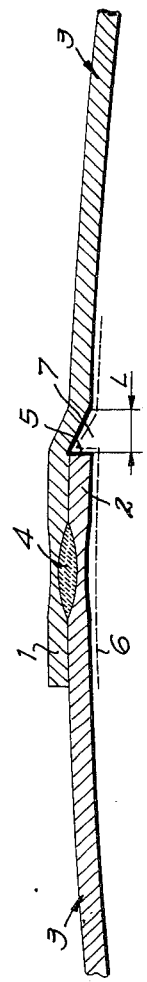
FIG. 2 shows a similar view to that of FIG. 1, but after application of the process according to the present invention.

As stated above, FIG. 1 shows the conventional weld area. It can be seen that edges 1 and 2 of sheet metal 3 which forms the body are merely superposed in such a manner that after carrying out the weld 4, the inner free edge surface 5 of aforesaid edge 2 and the neighbouring surface of edge 1 form a recess in which it is extremely difficult, if not entirely impossible, industrially to apply a coating of varnish 6 in such a manner as to have no break.

The process according to this invention consists in locally distorting sheet metal 3 in the proximity of its edge 1, in such a manner as to bring the inner surface of same to form part of the inner cylindrical surface of that same sheet metal in the proximity of its edge 2, and extremely close to the latter. Consequently a groove 7 is formed, the width L of which is chosen as small as possible, relative to the characteristics of the metal of sheet 3 and to the thickness of the latter.

In practice, width L is sufficiently small to assure a perfect coating of aforesaid edge surface 5 and of the adjacent area of edge 1, when taking into consideration the viscosity of the liquid applied in order to obtain the required protective coating.

The application of the above described process is easy.

It is indeed sufficient to provide two rolling rollers 8 and 9 at the output of the welding machine through which the welded seam is passed.

Roller 8 has a peripheral surface which is transversely curved to the same diameter as the inner surface of the body which has to be conditioned, whereas roller 9 is provided with an offset stepped area or portion 10 which operates the local upsetting of sheet metal 3 towards roller 8, in the vicinity of edge 1. The total height of step 10 is substantially equal to the thickness of sheet 3.

Figure 3:
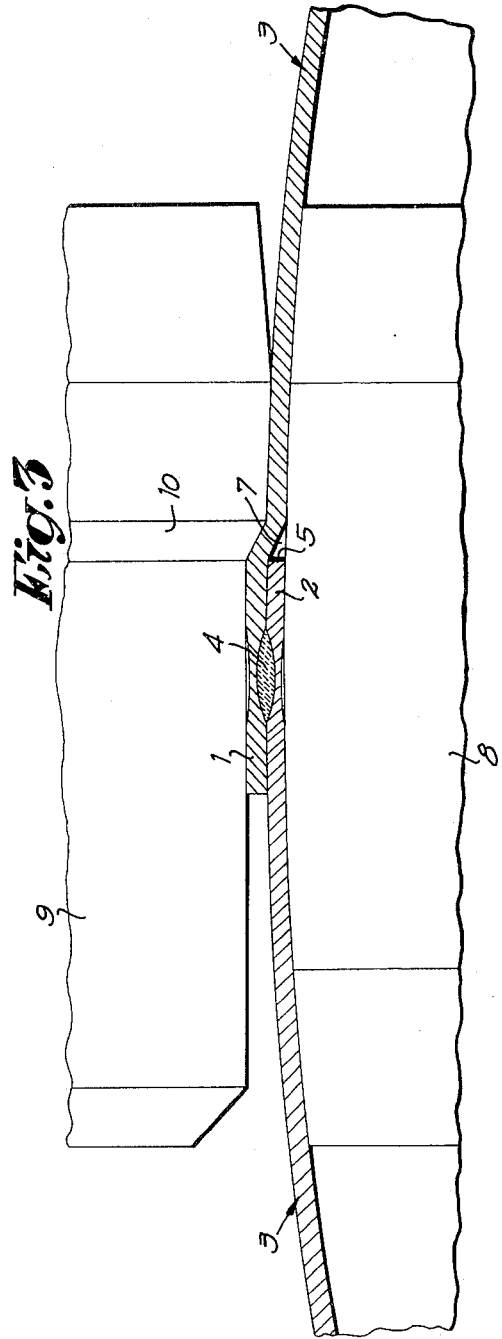
FIG. 3 schematically illustrates the means to be used in order to obtain a weld area as shown in FIG. 2.

It will be noted that roller 9 has two sections of different diameters separated by the step 10, which preferably is a beveled surface, as shown. The smaller diameter surface of roller 9 normally is spaced from the inner roller a distance approximately equal to the overlapped edge area thickness as shown in FIG. 3, while the larger diameter section of roller 9 is spaced from the inner roller a distance substantially equal to the thickness of can body 3. It should also be apparent from FIG. 3 that the welded seam area is passed through the rollers in accordance with this invention so that the inner free edge 5 lies closely opposite the bevel surface 10, with the juncture of the smaller diameter section of roller 9 and the bevel surface 10 lying opposite the edge 5 in the preferred embodiment illustrated.

It is obvious that other means may be used in order to obtain the required effect.

The present invention applies furthermore to all packing cans having a body which has been conditioned according to the above-described process as well as to the installations used for the application of same.

What I claim is:

1. A process for conditioning the welded lapped seam area of the body of a cylindrical packing can comprising:

a. lap seam welding the ends of the body of a cylindrical packing can to produce a joint having an inner free edge;

b. passing said welded lapped seam area along the weld direction through a roller pair comprising a first inner roller having an outer transverse contour corresponding to the internal diameter of said can body and a second outer roller having two sections of different diameters separated by an offset step portion of a height substantially equal to the thickness of said can body, said rollers being separated by a distance substantially equal to the thickness of the can body in the area between the larger diameter section of the second roller and said first roller, and a distance substantially equal to the lapped seam thickness in the area between the smaller diameter section of said second roller and said first roller, said lapped seam area passing through said roller pairs so that said offset step portion of said second outer roller is positioned closely opposite said inner free edge of the welded lapped seam during the conditioning process.

2. The process recited in claim 1, further wherein said offset step portion is a bevel surface, with said lapped seam area passing through said roller pair so that the intersection of said smaller diameter section of said second roller and said bevel surface lies opposite said inner free edge during the conditioning process.

* * * * *